(12) United States Patent
Seibel et al.

(10) Patent No.: US 10,954,944 B2
(45) Date of Patent: Mar. 23, 2021

(54) COMPRESSOR HAVING COUNTERWEIGHT ASSEMBLY

(71) Applicant: EMERSON CLIMATE TECHNOLOGIES, INC., Sidney, OH (US)

(72) Inventors: Stephen M. Seibel, Celina, OH (US); Jason Lochner, Union, OH (US); Mark A. Bonifas, Sidney, OH (US)

( * ) Notice: Subject to any disclaimer, the term of this patent is extended or adjusted under 35 U.S.C. 154(b) by 455 days.

(21) Appl. No.: 15/136,151

(22) Filed: Apr. 22, 2016

(65) Prior Publication Data

US 2016/0312780 A1    Oct. 27, 2016

Related U.S. Application Data

(60) Provisional application No. 62/153,217, filed on Apr. 27, 2015.

(51) Int. Cl.
*F04C 29/00* (2006.01)
*H02K 7/04* (2006.01)
(Continued)

(52) U.S. Cl.
CPC ...... *F04C 29/0021* (2013.01); *F04C 18/0215* (2013.01); *F04C 23/008* (2013.01);
(Continued)

(58) Field of Classification Search
None
See application file for complete search history.

(56) References Cited

U.S. PATENT DOCUMENTS 4,003,265 A * 1/1977 Craig ............... G01C 25/00
74/5 R
4,564,777 A * 1/1986 Senoo ............... H02K 1/278
310/156.22
(Continued)

FOREIGN PATENT DOCUMENTS

CN   101749236 A   6/2010
CN   102362417 A   2/2012
(Continued)

OTHER PUBLICATIONS

Office Action regarding Chinese Patent Application No. 201610269074.4, dated Apr. 16, 2018.
(Continued)

*Primary Examiner* — Peter J Bertheaud
*Assistant Examiner* — Geoffrey S Lee
(74) *Attorney, Agent, or Firm* — Harness, Dickey & Pierce, P.L.C.

(57) ABSTRACT

A compressor may include a shell. A compression mechanism may be disposed within the shell. A drive shaft may be disposed within the shell and drivingly engaged with the compression mechanism. A motor assembly may be drivingly engaged with the drive shaft and may include a rotor and a stator. A plurality of magnets may be disposed within the rotor and may cooperate with the stator to create an electromagnetic field between the rotor and the stator. A counterweight assembly may be secured to the drive shaft and configured to dynamically balance the compression mechanism and secure the plurality of magnets within the rotor.

6 Claims, 4 Drawing Sheets

(51) Int. Cl.
*F04C 18/02* (2006.01)
*F04C 23/00* (2006.01)
*H02K 1/28* (2006.01)
*H02K 1/27* (2006.01)

(52) U.S. Cl.
CPC ...... *F04C 29/0085* (2013.01); *F04C 2230/60* (2013.01); *F04C 2240/20* (2013.01); *F04C 2240/40* (2013.01); *F04C 2240/60* (2013.01); *F04C 2240/807* (2013.01); *F04C 2270/12* (2013.01); *F04C 2270/13* (2013.01); *H02K 1/276* (2013.01); *H02K 1/28* (2013.01); *H02K 7/04* (2013.01)

(56) References Cited

U.S. PATENT DOCUMENTS

| | | | | |
|---|---|---|---|---|
| 4,934,905 A * | 6/1990 | Richardson, Jr. | ... | F04B 39/0246 417/372 |
| 5,108,274 A * | 4/1992 | Kakuda | ... | F01C 1/0215 418/151 |
| 5,230,616 A * | 7/1993 | Serizawa | ... | F04C 29/0021 29/888.024 |
| 5,336,060 A * | 8/1994 | Tomell | ... | F04C 23/008 184/6.18 |
| 5,476,369 A * | 12/1995 | Fowlkes | ... | F04B 35/04 310/51 |
| 6,047,460 A * | 4/2000 | Nagate | ... | H02K 1/276 205/137 |
| 6,226,156 B1 * | 5/2001 | Kasetty | ... | G11B 5/59605 360/265 |
| 6,291,920 B1 * | 9/2001 | Miller | ... | F16F 15/28 310/261.1 |
| 6,305,914 B1 * | 10/2001 | Lifson | ... | F04C 29/0021 417/410.5 |
| 6,547,538 B1 * | 4/2003 | Tamura | ... | F04B 35/04 417/415 |
| 6,799,362 B2 * | 10/2004 | Murakami | ... | H02K 1/276 29/598 |
| 7,435,067 B2 * | 10/2008 | Doepker | ... | F04C 29/0021 417/410.5 |
| 7,504,756 B2 * | 3/2009 | Caprio | ... | H02K 17/165 310/211 |
| 7,986,068 B2 * | 7/2011 | Suzuki | ... | H02K 1/28 310/156.22 |
| 8,723,384 B2 * | 5/2014 | Yokota | ... | H02K 1/2766 310/156.22 |
| 8,992,188 B2 * | 3/2015 | Nakamura | ... | F04C 29/028 417/410.5 |
| 2003/0230948 A1 * | 12/2003 | Murakami | ... | H02K 1/276 310/156.53 |
| 2006/0133944 A1 | 6/2006 | Doepker et al. | | |
| 2006/0273683 A1 * | 12/2006 | Caprio | ... | H02K 17/165 310/211 |
| 2009/0315423 A1 * | 12/2009 | Suzuki | ... | H02K 1/276 310/156.12 |
| 2010/0150752 A1 * | 6/2010 | Nakamura | ... | F04C 23/008 417/410.5 |
| 2013/0251569 A1 * | 9/2013 | Duppert | ... | F04C 23/008 418/1 |
| 2015/0244238 A1 * | 8/2015 | Tanaka | ... | F04C 23/008 417/410.3 |

FOREIGN PATENT DOCUMENTS

| | | |
|---|---|---|
| CN | 203589903 U | 5/2014 |
| CN | 205876710 U | 1/2017 |
| JP | 201480939 A | 5/2014 |

OTHER PUBLICATIONS

Office Action regarding Korean Patent Application No. 10-2016-0051356, dated Apr. 30, 2018, Translation provided by Y.S. Chang & Associates.

Office Action regarding Chinese Patent Application No. 201610269074.4, dated Nov. 16, 2017, Translation provided by Y.S. Chang & Associates.

Office Action corresponding to Korean Application No. 1020160051356 dated Dec. 6, 2017, Translation provided by Y.S. Chang & Associates.

Office Action relating to Chinese Patent Application No. 201610269074.4, dated Jun. 13, 2018.

* cited by examiner

COMPRESSOR HAVING COUNTERWEIGHT ASSEMBLY

CROSS-REFERENCE TO RELATED APPLICATIONS

This application claims the benefit of U.S. Provisional Application No. 62/153,217, filed on Apr. 27, 2015. The entire disclosure of the above application is incorporated herein by reference.

FIELD

The present disclosure relates to a compressor having a counterweight assembly.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and one or more compressors circulating a working fluid (e.g., refrigerant or carbon dioxide) between the indoor and outdoor heat exchangers. Low cost, easily assembled, reliable compressors are desirable to ensure that the climate-control system in which the one or more compressors are installed is capable of effectively and efficiently providing a cooling and/or heating effect.

SUMMARY

This section provides a general summary of the disclosure and is not a comprehensive disclosure of its full scope or all of its features.

A compressor may include a shell. A compression mechanism may be disposed within the shell. A drive shaft may be disposed within the shell and drivingly engaged with the compression mechanism. A motor assembly may be drivingly engaged with the drive shaft and may include a rotor and a stator. A plurality of magnets may be disposed within the rotor and may cooperate with the stator to create an electromagnetic field between the rotor and the stator. A counterweight assembly may be secured to the drive shaft and configured to dynamically balance the compression mechanism and secure the plurality of magnets within the rotor.

The compressor may include a counterweight assembly having at least one counterweight secured to the drive shaft and providing a physical constraint to retain the plurality of magnets within the rotor. The counterweight assembly may be secured to the drive shaft with a press-fit.

The compressor may include a spacer on the at least one counterweight that positions a counterweight mass at a predetermined distance from the plurality of magnets to reduce flux leakage of the motor assembly due to the counterweight.

The compressor may include a spacer on the at least one counterweight having a plurality of lobes positioned to cover a plurality of bores housing the plurality of magnets in the rotor and retain the plurality of magnets within the plurality of bores.

The compressor may include a counterweight assembly having two counterweights, a first counterweight being positioned on a first end of the rotor and a second counterweight being positioned on a second end of the rotor. A first spacer on the first counterweight may contact the first end of the rotor and a second spacer on the second counterweight may contact the second end of the rotor.

The compressor may include a counterweight assembly having at least one counterweight secured to the drive shaft and a counterweight mass projecting from a first surface of the at least one counterweight to dynamically balance an orbiting mass of the compression mechanism.

The compressor may include a spacer projecting from a second surface of the at least one counterweight to provide spacing relative to the motor assembly to reduce the flux leakage of the motor assembly due to the counterweight mass and to provide a physical constraint to retain a plurality of magnets within a rotor of the motor assembly.

The compressor may include at least one counterweight having a main body with a first surface and a second surface, wherein the main body extends completely around the drive shaft. A counterweight mass may project from the first surface of the main body and extend partially around the drive shaft. A spacer may project from the second surface of the main body and extend completely around the drive shaft.

Another compressor may include a motor assembly having a rotor and stator. A drive shaft may be fixed with the rotor for rotation with the rotor. A compression mechanism may be drivingly engaged with the drive shaft. A counterweight may be fixed to the drive shaft and have a main body extending completely around the drive shaft and a counterweight mass projecting from a first surface of the main body and partially extending around the drive shaft. The counterweight may be configured to dynamically balance an orbiting mass of the compression mechanism and may physically constrain a plurality of magnets within the rotor without using fasteners. The counterweight mass may be positioned at a predetermined axial distance away from the rotor to reduce flux leakage of the motor assembly.

The compressor may include a spacer projecting from a second surface of the counterweight, wherein the second surface is opposite the first surface. The spacer may position the counterweight mass to reduce flux leakage of the motor assembly and may physically constrain the plurality of magnets within the rotor.

The compressor may include a spacer further having a plurality of lobes configured such that each of the plurality of lobes retains at least one of the plurality of magnets within the rotor.

The compressor may include a counterweight that is a single monolithic part.

The compressor may include at least one counterweight being formed of an iron alloy.

Another compressor may include a shell. A compression mechanism may be disposed within the shell. A motor assembly may include a rotor and a stator and may drive the compression mechanism through a drive shaft. A counterweight assembly may be disposed within the shell and connected to the driveshaft. The counterweight assembly may further include at least one counterweight having a main body, a counterweight mass, and a spacer. The counterweight mass may extend from a first surface of the main body. The spacer may extend from a second surface of the main body. The outer diameter of the spacer may be smaller than the outer diameter of the main body. A bore may extend from the first surface through the main body and the spacer and may be configured to receive the drive shaft. The bore may include a flat surface configured to mate with a flat surface on the drive shaft to position the counterweight on the drive shaft.

The compressor may include a spacer that is a star-shaped projection having a plurality of lobes, each of the plurality of lobes retaining at least one magnet within a bore in the rotor.

The compressor may include a bore of the counterweight having a bore in the main body that mates with a bore in the spacer, the bore in the main body and the bore in the spacer being of the same size and shape such that a smooth inner surface of the bore extends from the first surface of the main body to an outside surface of the spacer.

The compressor may include a counterweight having a main body that extends completely around the drive shaft, a counterweight mass that partially extends around the drive shaft, and a spacer that extends completely around the drive shaft.

The compressor may include a first counterweight that is positioned on a top side of a rotor and a second counterweight that is positioned on a bottom side of the rotor. A flat surface on a drive shaft is one of a plurality of flat surfaces on the drive shaft. A first of the plurality of flat surfaces on the drive shaft may be on a first end of the drive shaft, and a second of the plurality of flat surfaces on the drive shaft may be on a second end of the drive shaft. The first of the plurality of flat surfaces is rotated relative to the second of the plurality of flat surfaces such that the first counterweight is rotated relative to the second counterweight on the drive shaft. A second surface of the first counterweight may face a second surface of the second counterweight when the first counterweight and the second counterweight are positioned on the driveshaft.

The compressor may include a main body, a counterweight mass, and a spacer that is a single monolithic part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
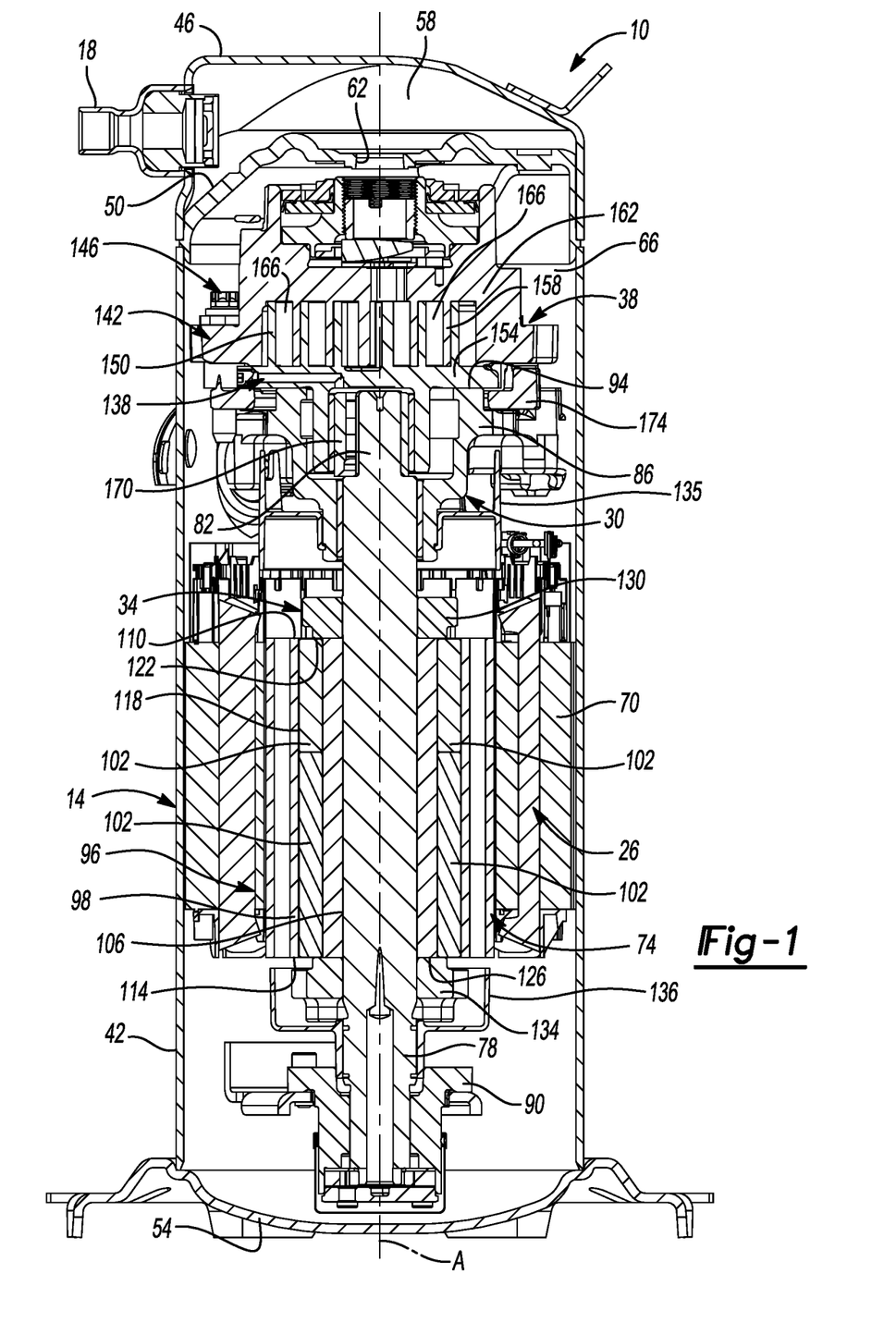
FIG. 1 is a cross-sectional view of a compressor having a counterweight assembly according to the principles of the present disclosure.
Figure 2:
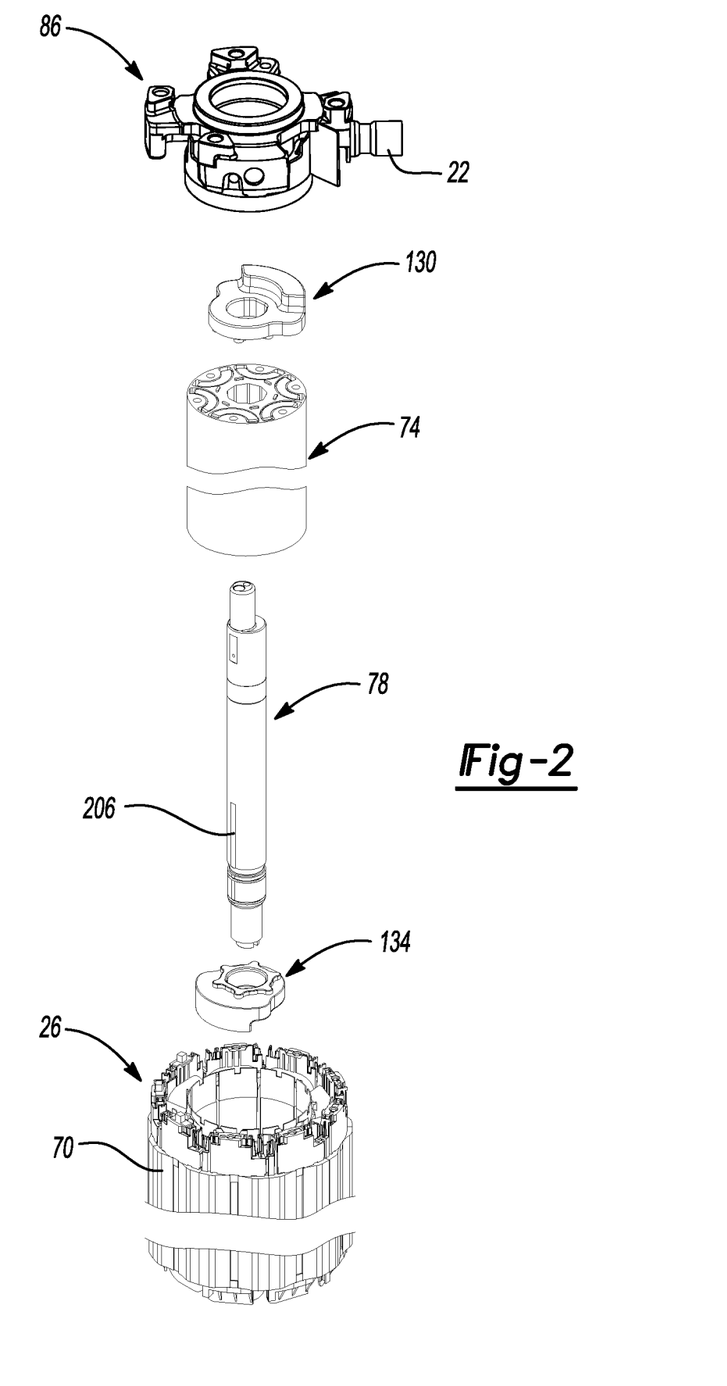
FIG. 2 is a partial exploded view of the compressor having the counterweight assembly illustrated in FIG. 1.
Figure 3:
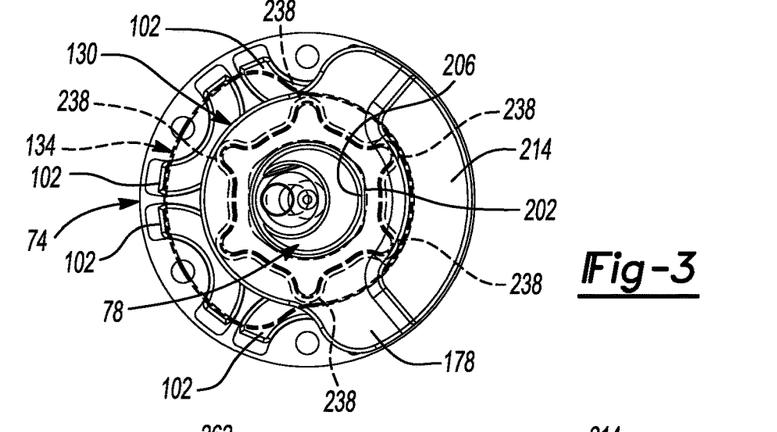
FIG. 3 is a top view of the counterweight assembly, a rotor, and a drive shaft of the compressor illustrated in FIG. 1.
Figure 4:
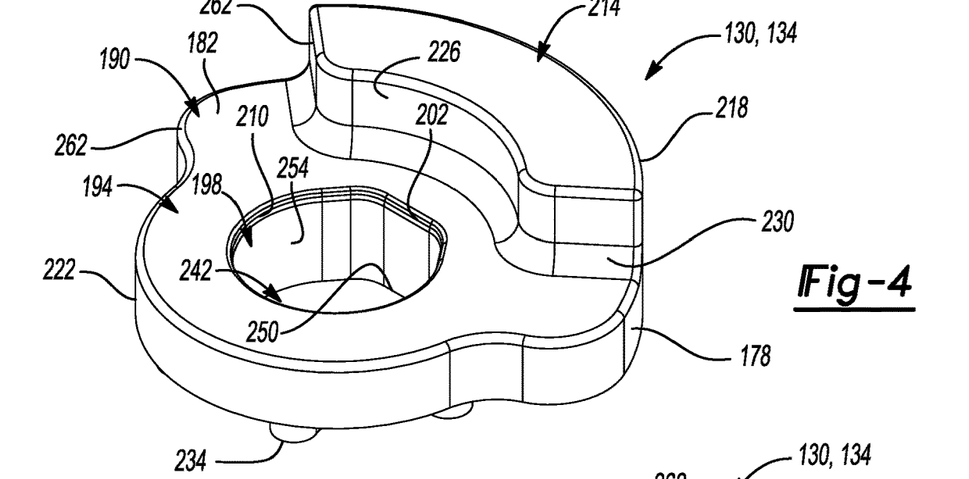
FIG. 4 is a top perspective view of a counterweight of the counterweight assembly illustrated in FIG. 2.
Figure 5:
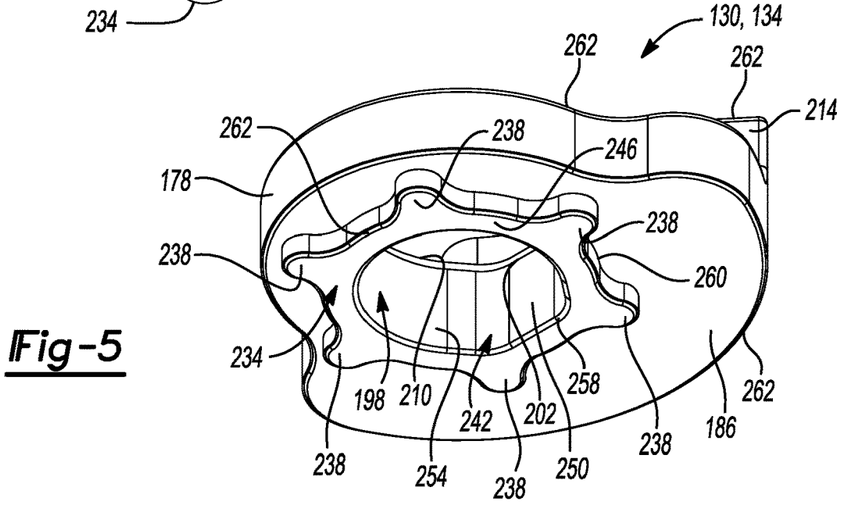
FIG. 5 is a bottom perspective view of the counterweight of FIG. 4.

With reference to FIGS. 1-3, a compressor 10 is provided that may include a shell assembly 14, a discharge fitting 18, a suction inlet fitting 22, a motor assembly 26, a bearing housing assembly 30, a counterweight assembly 34, and a compression mechanism 38.

The shell assembly 14 may house the motor assembly 26, the bearing housing assembly 30, the counterweight assembly 34, and the compression mechanism 38. The shell assembly 14 may include a generally cylindrical shell 42, an end cap 46, a transversely extending partition plate 50, and a base 54. The end cap 46 may be fixed to an upper end of shell 42. The base 54 may be fixed to a lower end of shell 42. The end cap 46 and partition 50 may define a discharge chamber 58 (i.e., a discharge-pressure region) therebetween that receives compressed working fluid from the compression mechanism 38. The partition plate 50 may include an opening 62 providing communication between the compression mechanism 38 and the discharge chamber 58. The discharge chamber 58 may generally form a discharge muffler for the compressor 10. The discharge fitting 18 may be attached to the end cap 46 and is in fluid communication with the discharge chamber 58. The suction inlet fitting 22 may be attached to the shell 42 and may be in fluid communication with a suction chamber 66 (i.e., a suction-pressure region). The partition plate 50 separates the discharge chamber 58 from the suction chamber 66.

The motor assembly 26 may include a motor stator 70, a rotor 74, and a drive shaft 78. The stator 70 may be press-fit into the shell 42. The drive shaft 78 may be rotatably driven by the rotor 74 and supported by the bearing housing assembly 30. The drive shaft 78 may include an eccentric crank pin 82 having a flat portion thereon for driving engagement with the compression mechanism 38. The rotor 74 may be press-fit on the drive shaft 78.

The bearing housing assembly 30 may include a main, or upper, bearing housing 86 and a lower bearing housing 90 fixed within the shell 42. The main bearing housing 86 may include an annular flat thrust bearing surface 94 that supports the compression mechanism 38 thereon. The main bearing housing 86 may cooperate with the lower bearing housing 90 to define a cavity 96 to receive the counterweight assembly 34 and the motor assembly 26.

The rotor 74 may include a body, or housing, 98 and a plurality of magnets 102. The housing 98 may include a generally cylindrical construct defining a cylindrical inner surface 106. As the rotor 74 is press-fit on the drive shaft 78, the inner surface 106 may remain in contact with the drive shaft 78.

The housing 98 may further include a first end surface 110 and a second end surface 114 opposite the first end surface 110. The first end surface 110 may include a plurality of bores 118 for receiving the magnets 102. In an example embodiment, the plurality of bores 118 may be cylindrical and may extend from the first end surface 110 through the second end surface 114 such that the bores 118 completely traverse through the housing 98. In other embodiments, the bores 118 may extend a predetermined distance from the first end surface 110 into the housing 98 but terminate before reaching the second end surface 114 such that the bores 118 do not completely traverse through the housing 98. In other embodiments, the bores 118 may also be a shape other than a cylindrical shape, such as a square, rectangular, triangular, hexagonal, star, or any other shape. The magnets 102 may extend the entire length of the bores 118 either with a single magnet 102 per bore 118 or a plurality of magnets 102 per bore 118.

A first interface 122 between the counterweight assembly 34 and the first end surface 110 and a second interface 126 between the counterweight assembly 34 and the second end surface 114 may cooperate to retain the plurality of magnets 102 within the plurality of bores 118, as described in more detail below.

The counterweight assembly 34 may further include a first, or upper, counterweight 130 and a second, or lower, counterweight 134. The upper counterweight 130 may be press-fit onto the drive shaft 78 between the main bearing housing 86 and the rotor 74 and on the first end surface 110 of the rotor 74. The lower counterweight 134 may be press-fit onto the drive shaft 78 on the second end surface 114 of the rotor 74. An upper counterweight cap 135 and a lower counterweight cap 136 may be positioned above the upper counterweight 130 and below the lower counterweight 134, respectively, to shield the upper counterweight 130 and the lower counterweight 134 from oil during operation of the compressor 10.

The compression mechanism 38 may be driven by the motor assembly 26 and may generally include an orbiting scroll member 138 and a non-orbiting scroll member 142. The non-orbiting scroll member 142 may be fixed to the bearing housing assembly 30 by a plurality of fasteners 146, such as threaded bolts or similar attachment features. The orbiting scroll member 138 includes an orbiting spiral wrap 150 extending from an orbiting end plate 154, and the non-orbiting scroll member 142 includes a non-orbiting spiral wrap 158 extending from a non-orbiting end plate 162. The orbiting spiral wrap 150 meshingly engages the non-orbiting spiral wrap 158 to create a plurality of fluid pockets 166 therebetween.

The drive shaft 78 may rotatably engage the orbiting scroll member 138, via a bushing 170, to cause orbital movement of the orbiting scroll member 138 relative to the non-orbiting scroll member 142 as the drive shaft 78 rotates. The rotating or orbiting portion of the compression mechanism 38 may be referred to as an orbiting mass. In some embodiments, for example, the orbiting mass may include the orbiting scroll member 138 and the eccentric crank pin 82.

An Oldham coupling 174 may be keyed to the orbiting scroll member 138 and a stationary structure (e.g., the bearing housing assembly 30 or the non-orbiting scroll member 142) to prevent relative rotation between the orbiting and non-orbiting scroll members 138, 142 while allowing the orbiting scroll member 138 to move in an orbital path relative to the non-orbiting scroll member 142. The plurality of fluid pockets 166 are moving fluid pockets that are formed between the orbiting and non-orbiting spiral wraps 150, 158. The fluid pockets 166 decrease in size as they move from a radially outer position to a radially inner position, thereby compressing the working fluid therein from the suction pressure to the discharge pressure.

Now referring to FIGS. 4-8, a representative one of the upper counterweight 130 and the lower counterweight 134 is illustrated. While the upper counterweight 130 and the lower counterweight 134 are illustrated as having the same configuration, it is noted that the upper counterweight 130 and the lower counterweight 134 could have different configurations or shapes to aid in balancing the orbiting scroll member 138 and the eccentric crank pin 82 (i.e., the orbiting mass) on the drive shaft 78 or retaining the magnets 102 within the rotor 74.

Figure 6:
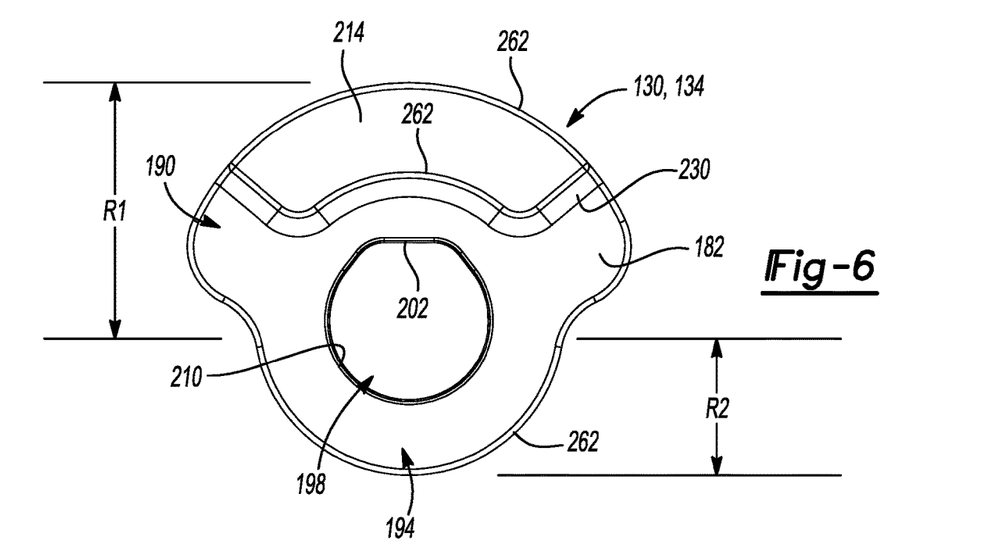
FIG. 6 is a top view of the counterweight of FIG. 4.
Figure 7:
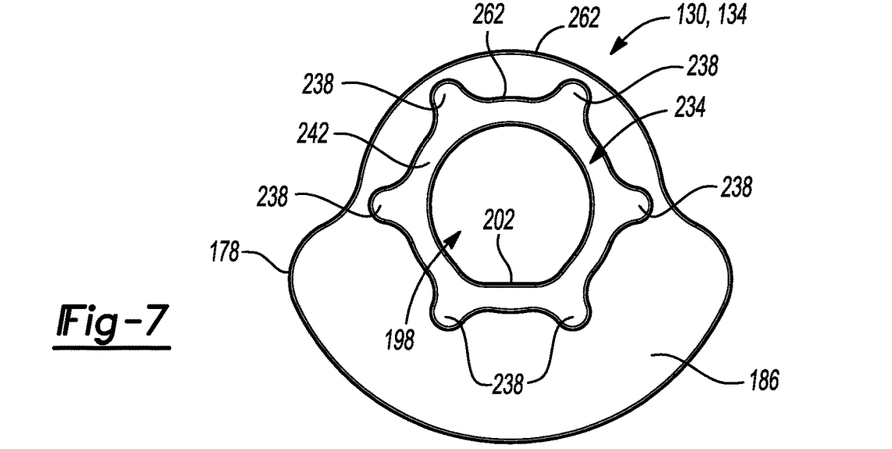
FIG. 7 is a bottom view of the counterweight of FIG. 4.
Figure 8:
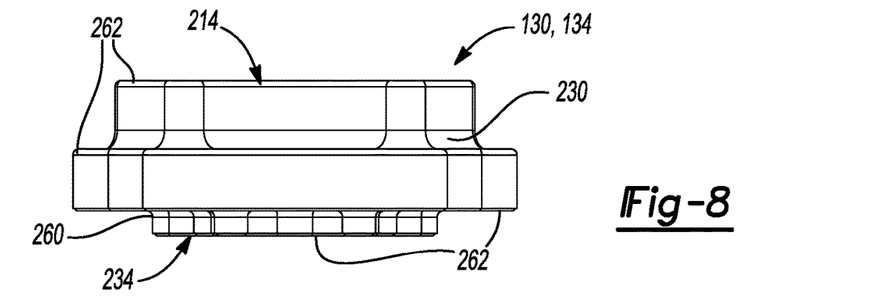
FIG. 8 is a side view of the counterweight of FIG. 4.

The upper counterweight 130 and the lower counterweight 134 may be formed of an iron copper steel powder metal alloy, brass, cast zinc, laminated steel, or any other suitable material, and may provide a counterweight mass to the drive shaft 78 to balance the orbiting mass during rotation. The upper and lower counterweight 130, 134 may include a main body 178 having a top, or first, side or surface 182 and a bottom, or second, side or surface 186. The main body 178 may have a shape consisting of two circular halves, where a first half 190 has a radius R1 that is larger than a radius R2 of a second half 194 (FIG. 6).

The main body 178 may have a bore 198 extending from the first side 182 to the second side 186. The bore 198 may be a generally cylindrical bore 198 with a single flat portion, or surface, 202 that positions the upper and lower counterweight 130, 134 relative to the drive shaft 78 and each other. The flat portion 202 may mate with an opposing flat surface, or portion, 206 on the drive shaft 78 (FIGS. 2 and 3) to key the upper and lower counterweight 130, 134 to the drive shaft 78. Each flat portion 202 on the upper and lower counterweight 130, 134 may mate with one of a plurality of opposing flat surfaces 206 on the drive shaft 78, where the plurality of opposing flat surfaces 206 are each located at an opposite end of the drive shaft 78 and rotated relative to one another on the drive shaft 78. For example, the plurality of opposing flat surfaces 206 may be rotated 180 degrees apart. The flat portion 202 on the upper and lower counterweight 130, 134 may be positioned on each upper and lower counterweight 130, 134 such that the upper and lower counterweight 130, 134 are positioned 180 degrees opposite from each other on the drive shaft 78 and the second side 186 of upper counterweight 130 faces the second side 186 of lower counterweight 134 (i.e., the first side 182 of the upper counterweight 130 faces up and the first side 182 of the lower counterweight 134 faces down).

The bore 198 may include a radius, or rounded edge, 210 where the bore 198 transitions to, or meets, the first surface 182. The rounded edge 210 may protect the drive shaft 78 as the upper and lower counterweight 130, 134 are press-fit onto the drive shaft 78. For example only, the rounded edge 210 may prevent the upper and lower counterweight 130, 134 from unnecessarily scratching or otherwise damaging the drive shaft 78 as the upper and lower counterweight 130, 134 are press-fit onto the drive shaft 78.

A counterweight mass 214 may project or extend from the first surface 182. The counterweight mass 214 may be of an iron alloy material and may be formed onto the main body 178 such that the counterweight mass 214 and the main body 178 form a single, monolithic part or single, unitary piece. The counterweight mass may also be of a laminated steel or any other suitable material such that the counterweight mass 214 and the main body 178 form a single, monolithic part (as opposed to two separate parts fixed together). Forming the counterweight mass 214 and the main body 178 as a monolithic part (instead of two separate pieces fixed together) reduces the number of parts for assembly, reduces manufacturing costs, eases assembly (reducing the risk of mistake or error), and eliminates purchasing of additional parts. In alternative embodiments, however, the counterweight mass 214 and the main body 178 could be separate parts fixed together so that the counterweight mass 214 and main body 178 could be different materials.

The counterweight mass 214 may be formed on the first half 190 of the main body 178 having the larger radius R1. The counterweight mass 214 may have an outer surface 218 that aligns with an outer perimeter 222 of the main body 178 such that the outer surface 218 and the outer perimeter 222 form a smooth surface, and the counterweight mass 214 transitions into the main body 178 creating a single, unitary piece. An inner surface 226 of the counterweight mass 214 may be spaced from the edge 210 of the bore 198 so that the counterweight mass 214 does not contact the drive shaft 78 or interfere with the rotation of the drive shaft 78. The counterweight mass 214 may include fillet, or rounded edge, 230 where the counterweight mass 214 transitions to the first surface 182.

A spacer, or projection, 234 (FIGS. 5, 7, and 8) may project from the second surface 186 of the main body 178 to provide a physical constraint to hold the magnets 102 (FIGS. 1 and 3) within the rotor 74 without the use of bolts or other fasteners. The elimination of the use of other fasteners typically used to retain the magnets 102 within the rotor 74 provides significant cost reduction for the compressor 10.

The spacer 234, combined with the main body 178, further positions the counterweight mass 214 at a specified, or predetermined, distance away from the rotor magnets 102 so as not to hinder an electromagnetic field between the plurality of magnets 102 in the rotor 74 and the stator 70. The counterweight mass 214, as previously described, is a large portion of an iron alloy, and if positioned too close to the plurality of magnets 102, the counterweight mass 214 could interfere with the electromagnetic field between the rotor 74 and the stator 70, potentially damaging or reducing the efficiency of the motor assembly 26. Because of the thickness and size of the spacer 234, the spacer 234 contains a lower mass than the counterweight mass 214 and the main body 178. The mass of the spacer 234 is low enough that the spacer 234 mass becomes negligible and does not affect the electromagnetic field. For example only, the spacer 234 positions the counterweight mass 214 approximately 4 millimeters (mm) from the plurality of magnets 102 to avoid interference with the electromagnetic field and reduce flux leakage of the motor assembly 26 due to the counterweight mass 214.

Flux leakage is the reduction of a magnetic field or requiring more power consumption to achieve the equivalent amount of magnetic field without the flux leakage. Having a ferrous mass, such as the counterweight mass 214, in close proximity to the plurality of magnets 102 in the rotor 74 reduces the intensity of the magnetic field and, therefore, reduces the motor torque and efficiency. The small cross section on the counterweight 130,134 moves the bulk of the mass of the counterweight 130, 134 away from the plurality of magnets 102 in the rotor 74. This minimizes the negative impact of having the ferrous mass, or counterweight mass 214, close to the plurality of magnets 102 in the rotor 74.

While the spacer 234 is described to position the counterweight mass 214 approximately 4 mm from the plurality of magnets 102, the distance may be greater or smaller than 4 mm depending on the specific application.

The spacer 234 may be positioned around the bore 198 on the second surface 186. The spacer 234 may be a star-shaped projection with a plurality of defined, rounded points, lobes, or protrusions, 238. For example only, there may be six rounded lobes 238 to cover each of the bores 118 in the rotor housing 98 housing the magnets 102. While the lobes 238 are illustrated and described as rounded points, the lobes 238 may also be rectangular, or other-shaped, projections or protrusions. By creating the spacer 234 as a star-shaped projection, less material (and less non-counterweight mass weight) may be utilized to retain the magnets 102 within the rotor 74.

The spacer 234 may further include a bore 242 extending from an outer surface 246 and through the spacer 234 to meet and align with the bore 198 in the main body 178. The bore 242 may be a generally cylindrical bore 242 of the same size and shape as the bore 198 in the main body. The bore 242 may also include a single flat portion, or surface, 250 that cooperates with the flat portion 202 in the bore 198 to position the upper and lower counterweight 130, 134 relative to the drive shaft 78 and each other. The flat portion 250, along with the flat portion 202, may mate with the opposing flat surface, or portion, 206 on the drive shaft 78 (FIGS. 2 and 3) to key the upper and lower counterweight 130, 134 to the drive shaft 78. The bore 242 may be of the same size and shape as the bore 198 such that the bore 242 mates seamlessly with the bore 198 and provides a smooth inner wall 254 extending through the entire counterweight 130, 134.

The spacer 234 may include a radius, or rounded edge, 258 where the bore 242 transitions to, or meets, the outer surface 246. The rounded edge 258 may protect the drive shaft 78 as the upper and lower counterweight 130, 134 are press-fit onto the drive shaft 78. For example only, the rounded edge 258 may prevent the upper and lower counterweight 130, 134 from unnecessarily scratching or otherwise damaging the drive shaft 78 as the upper and lower counterweight 130, 134 are press-fit onto the drive shaft 78. The spacer 234 may also include a fillet, or rounded edge, 260 where the spacer 234 transitions to the second surface 186 of the main body 178.

The spacer 234 may be of an iron alloy material and may be formed into the main body 178 such that the spacer 234 and the main body 178 are a single, monolithic part or single, unitary piece. Forming the spacer 234 and the main body 178 as a monolithic part (instead of two separate pieces fixed together) reduces the number of parts for assembly, reduces manufacturing costs, eases assembly (reducing the risk of mistake or error), and eliminates purchasing of additional parts. In alternative embodiments, however, the spacer 234 and the main body 178 could be separate parts fixed together so that the spacer 234 and main body 178 could be different materials, optimized for the functions of the spacer 234 and the main body 178.

Remaining edges 262 of the upper and lower counterweight 130, 134 may be chamfered, rounds, or fillets to protect the surrounding parts in the compressor 10. For example only, rounded edges 262 may prevent the upper and lower counterweight 130, 134 from unnecessarily scratching or otherwise damaging the drive shaft 78, rotor 74, stator 70, and other parts of the compressor 10 as the upper and lower counterweight 130, 134 are press-fit onto the drive shaft 78.

The upper and lower counterweight 130, 134 are each a press-fit counterweight providing three functions from a single piece design: (1) providing a counterweight mass 214 to dynamically balance the mass of the orbiting scroll member 138 and the eccentric crank pin 82 on the drive shaft 78 as the orbiting mass orbits; (2) providing a spacer 234 to position the counterweight mass 214 at a predetermined distance away from the rotor magnets so as not to hinder the electromagnetic field between the rotor 74 and stator 70; and (3) providing a physical constraint to hold the plurality of magnets 102 within the bores 118 in the rotor 74 without the use of bolts or other fasteners.

Although the counterweight assembly is illustrated and described in relation to balancing a motor assembly having a rotor disposed radially inwardly relative to a stator, it is understood that the counterweight assembly can also be used in conjunction with an inside-out motor, (e.g., one in which the rotor is disposed radially outwardly of the stator) to balance the orbiting mass, position the counterweight mass so as to not hinder the electromagnetic field of the motor, and to provide a physical constraint to hold the plurality of magnets within the bores of the rotor without the use of bolts or other fasteners.

Now referring to FIGS. 1-3, during operation of the compressor 10, the drive shaft 78 may rotate about a rotational axis A to cause orbital movement of the orbiting scroll member 138 relative to the non-orbiting scroll member 142 so that the working fluid within the pockets 166 is compressed as the pockets 166 move from a radially outer position (e.g., at suction pressure) toward a radially inner position (e.g., at discharge pressure). The rotor 74 and stator 70 of the motor assembly 26 cooperate to rotate the drive shaft 78. The upper and lower counterweights 130, 134 of the counterweight assembly 34 cooperate to dynamically balance the orbiting mass as it orbits. As the orbiting scroll member 138 moves relative to the non-orbiting scroll member 142, the orbiting scroll member 138 and the eccentric crank pin 82 on the drive shaft 78 create a weight imbalance relative to the rotational axis A of the drive shaft 78. As a result, the upper and lower counterweights 130, 134 are provided for balancing purposes to reduce vibration and noise of the overall assembly by internally balancing and/or cancelling out inertial forces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
a shell;
a compression mechanism disposed within the shell;
a motor assembly having a rotor and a stator and driving the compression mechanism through a drive shaft; and
a counterweight assembly disposed within the shell,
wherein the counterweight assembly includes:
at least one counterweight having a main body, a counterweight mass, and a spacer, wherein
the counterweight mass extends from a first surface of the main body,
the spacer extends from a second surface of the main body opposite the first surface, wherein an outer diameter of the spacer is smaller than an outer diameter of the main body,
a bore extends from the first surface through the main body and the spacer and receives the drive shaft, the spacer being positioned concentric with the main body and symmetric about the bore,
wherein the bore includes a flat surface configured to mate with a flat surface on the drive shaft to position the counterweight on the drive shaft, the flat surface on the bore extending from the first surface through the main body and the spacer and being aligned with a center of an arc of the counterweight mass, and
the counterweight and spacer are press-fit on the drive shaft.

2. The compressor of claim 1, wherein the spacer is a star-shaped projection having a plurality of lobes, each of the plurality of lobes retaining at least one magnet within a bore in the rotor.

3. The compressor of claim 1, wherein the bore includes a bore in the main body that mates with a bore in the spacer, the bore in the main body and the bore in the spacer being of a same size and shape such that a smooth inner surface of the bore extends from the first surface of the main body to an outside surface of the spacer.

4. The compressor of claim 1, wherein
the main body extends completely around the drive shaft,
the counterweight mass partially extends around the drive shaft, and
the spacer extends completely around the drive shaft.

5. The compressor of claim 1, wherein
a first counterweight of the at least one counterweight is positioned on a top side of the rotor and a second counterweight of the at least one counterweight is positioned on a bottom side of the rotor,
the flat surface on the drive shaft is one of a plurality of flat surfaces on the drive shaft, a first of the plurality of flat surfaces on the drive shaft being on a first end of the drive shaft and a second of the plurality of flat surfaces on the drive shaft being on a second end of the drive shaft and being rotated relative to the first of the plurality of flat surfaces such that the first counterweight is rotated relative to the second counterweight on the drive shaft, and
the second surface of the first counterweight faces the second surface of the second counterweight when the first counterweight and the second counterweight are positioned on the drive shaft.

6. The compressor of claim 1, wherein the main body, counterweight mass, and spacer of the at least one counterweight is a single monolithic part.

\* \* \* \* \*